(12) United States Patent
Aboulhouda et al.

(10) Patent No.: US 7,710,186 B2
(45) Date of Patent: May 4, 2010

(54) AVERAGING CIRCUIT APPARATUS, ERROR SIGNAL GENERATION SYSTEM AND METHOD OF AVERAGING AN ERROR SIGNAL

(75) Inventors: Samir Aboulhouda, Ipswich (GB); Fesseha Tessera Seifu, London (GB)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 242 days.

(21) Appl. No.: 11/455,377

(22) Filed: Jun. 19, 2006

(65) Prior Publication Data

US 2007/0018631 A1    Jan. 25, 2007

(30) Foreign Application Priority Data

Jul. 7, 2005    (GB) ................................. 0513900.1

(51) Int. Cl.
*G06F 7/42* (2006.01)

(52) U.S. Cl. ................. 327/361; 327/355; 375/229; 375/233

(58) Field of Classification Search ........................ None
See application file for complete search history.

(56) References Cited

U.S. PATENT DOCUMENTS

| 4,513,716 | A | * | 4/1985 | Haraguchi et al. | ..... 123/406.36 |
| 4,891,605 | A | * | 1/1990 | Tirkel | .......................... 330/279 |
| 5,329,223 | A | * | 7/1994 | Riggio | .......................... 323/246 |
| 5,339,463 | A | * | 8/1994 | Hansen | .......................... 455/213 |
| 5,444,359 | A | * | 8/1995 | Riggio | .......................... 323/237 |
| 6,084,439 | A | | 7/2000 | Sculley | |

FOREIGN PATENT DOCUMENTS

| DE | 210993 | 10/1982 |
| GB | 1115431 | 5/1968 |
| JP | 01068664 | 3/1989 |

* cited by examiner

*Primary Examiner*—An T Luu

(57) ABSTRACT

An averaging circuit apparatus comprises a rectifier having an input for receiving a high-speed error signal having, for example, a data rate of 10 Gbps. An integrator is coupled to the rectifier and has an error output for providing an averaged representation of the error signal. The averaged representation of the error signal is supplied to a Digital Signal Processor in a channel equalizer loop for equalizing a fiber-optic channel. The Digital Signal Processor executes an algorithm that sets tap coefficients of an analogue filter in response to the averaged representation of the error signal.

12 Claims, 3 Drawing Sheets

AVERAGING CIRCUIT APPARATUS, ERROR SIGNAL GENERATION SYSTEM AND METHOD OF AVERAGING AN ERROR SIGNAL

The present invention relates to an averaging circuit apparatus of the type, for example, that receives an input error signal and generates an averaged representation of the input error signal. The present invention also relates to an error signal generation system of the type, for example, that generates an error signal using an input sequence of symbols and generates an averaged representation of the error signal. The present invention further relates to a method of averaging an error signal.

In the field of optical equalisation, it is currently desirable to develop Integrated Circuits (ICs) to extend electrically the optical transmission distance achievable at 10 Gb/s over multi-mode fibre. A short-term goal is to achieve lossless data transmission at 10 Gb/s over 300 meters of multi-mode grade fibre. Currently, an equalizer architecture sufficiently robust to achieve the 300 meters of lossless transmission consistently is not available. Work is thus underway in a number of companies to improve the performance of the analogue ICs in terms of bandwidth and linearity and their implementations in silicon and software to achieve this 300 meter goal.

A channel equalisation loop typically comprises a filter unit having tap coefficients that are adapted by a controller implementing an algorithm. The algorithm responds to a Mean Square Error (MSE) signal received from an MSE calculation unit, or some other measure of error, the MSE signal constituting a direct measure of so-called "eye quality". The MSE unit is supplied with a bit stream input signal based upon an output signal generated by the filter unit. In order to perform a mean square error calculation, the MSE unit comprises a multiplier circuit.

However, at high data-rates, for example 10 Gbps, known multiplier circuits are unable to maintain high linearity and provide sufficient voltage headroom. In relation to linearity, Total Harmonic Distortion (THD) being a measure thereof, the multiplier circuit has to multiply two Radio Frequency (RF) input signals, each having a same dynamic range and amplitude. Known multiplier circuits are unable to maintain linearity at high frequencies combined with high amplitudes, and so introduce further intermodulation distortions, or high THD, when multiplying the two input signals. Consequently, an additional error component is introduced to the intrinsic MSE signal being calculated, and the algorithm does not converge upon an optimum solution, i.e. optimum selection of tap coefficients.

In relation to headroom, known classical multiplier circuits are based upon a so-called "Gilbert Cell", a cascoded differential pair circuit. Gilbert cells, typically, have little voltage headroom available, and so at low supply voltages, for example 2.5 V and below, and when processing high dynamic range input signals, it is, from both a design and practical perspective, difficult to provide sufficient voltage headroom for bipolar transistors used in the Gilbert cell. In contrast, Complementary Metal Oxide Semiconductor (CMOS) transistors, a possible solution for the lack of headroom, lack sufficient bandwidth for equalization applications at 10 Gbps.

According to a first aspect of the present invention, there is provided an averaging circuit apparatus comprising: a rectifier having an input for receiving an error signal; and an integrator coupled to the rectifier, the integrator having an error output for providing an averaged representation of the error signal.

The input may be a differential input for receiving a differential error signal.

The apparatus may further comprise a reference output for providing a reference signal derived from the error signal.

The rectifier may be a half-wave rectifier.

The rectifier may be a first differential pair circuit arrangement.

The integrator may be a filter, for example a low-pass filter. The integrator may be a resistor-capacitor circuit arrangement. The integrator may be arranged to provide the averaged representation of the error signal, the averaged representation being over a predetermined period of time. The predetermined period of time may be selectable.

The apparatus may further comprise a reference circuit arrangement coupled to the reference output. The reference circuit arrangement may be a second differential pair circuit arrangement. The second differential pair circuit arrangement may be arranged to operate, when in use, in a common mode.

The apparatus may further comprise a first level shifter for shifting a bias level of the averaged representation of the error signal. The apparatus may further comprise a second level shifter for shifting a bias level of the reference signal.

The rectifier and the integrator may be arranged, when in use, to provide an approximation of a mean square error signal at the error output for constituting the averaged representation of the error signal.

The apparatus may further comprise an input data rate, when in use, greater than about 1 Gbps, for example, more than about 5 Gbps, such as about 10 Gbps. The apparatus may further comprise an input data rate, when in use, of a same order of magnitude as a transition frequency of a switching device of the rectifier.

The rectifier may be arranged, when in use, to receive the error signal, the error signal being associated with a fibre-optic channel.

The fibre-optic channel may be a multimode fibre-optic channel.

The rectifier may be non-linear.

According to a second aspect of the present invention, there is provided a root mean square error circuit comprising the averaging circuit apparatus as set forth above in relation to the first aspect of the invention.

According to a third aspect of the present invention, there is provided an error signal generation system comprising: a decision unit for recovering an approximation of a plurality of symbols from an input signal, the decision unit being coupled to an error signal generator for generating an error signal from the recovered approximation of the plurality of symbols and the input signal; and an averaging circuit as set forth above in relation to the first aspect of the invention for receiving the error signal at the input thereof and generating the averaged representation of the error signal in response thereto.

The input signal may be an input sequence of symbols comprising inter-symbol interference.

According to a fourth aspect of the present invention, there is provided a channel equaliser system comprising the averaging circuit apparatus as set forth above in relation to the first aspect of the invention, or the error signal generation system as set forth above in relation to the third aspect of the invention.

According to a fifth aspect of the present invention, there is provided a method of averaging an error signal, the method comprising the steps of: receiving the error signal; rectifying the error signal to yield a rectified signal; and integrating the rectified signal to provide an output signal that is an averaged representation of the error signal.

The method may further comprise the step of: level shifting the output signal.

It is thus possible to provide an averaging circuit apparatus, an error signal generation system and a method of averaging an error signal that does not suffer from limitations of lack of headroom, and lack of linearity of circuit elements used to generate the averaged representation of the error signal. A simpler method and structure are also provided, thereby reducing implementation complexity and hence cost.

At least one embodiment of the invention will now be described, by way of example only, with reference to the accompanying drawings, in which.

Throughout the following description identical reference numerals will be used to identify like parts.

Figure 1:
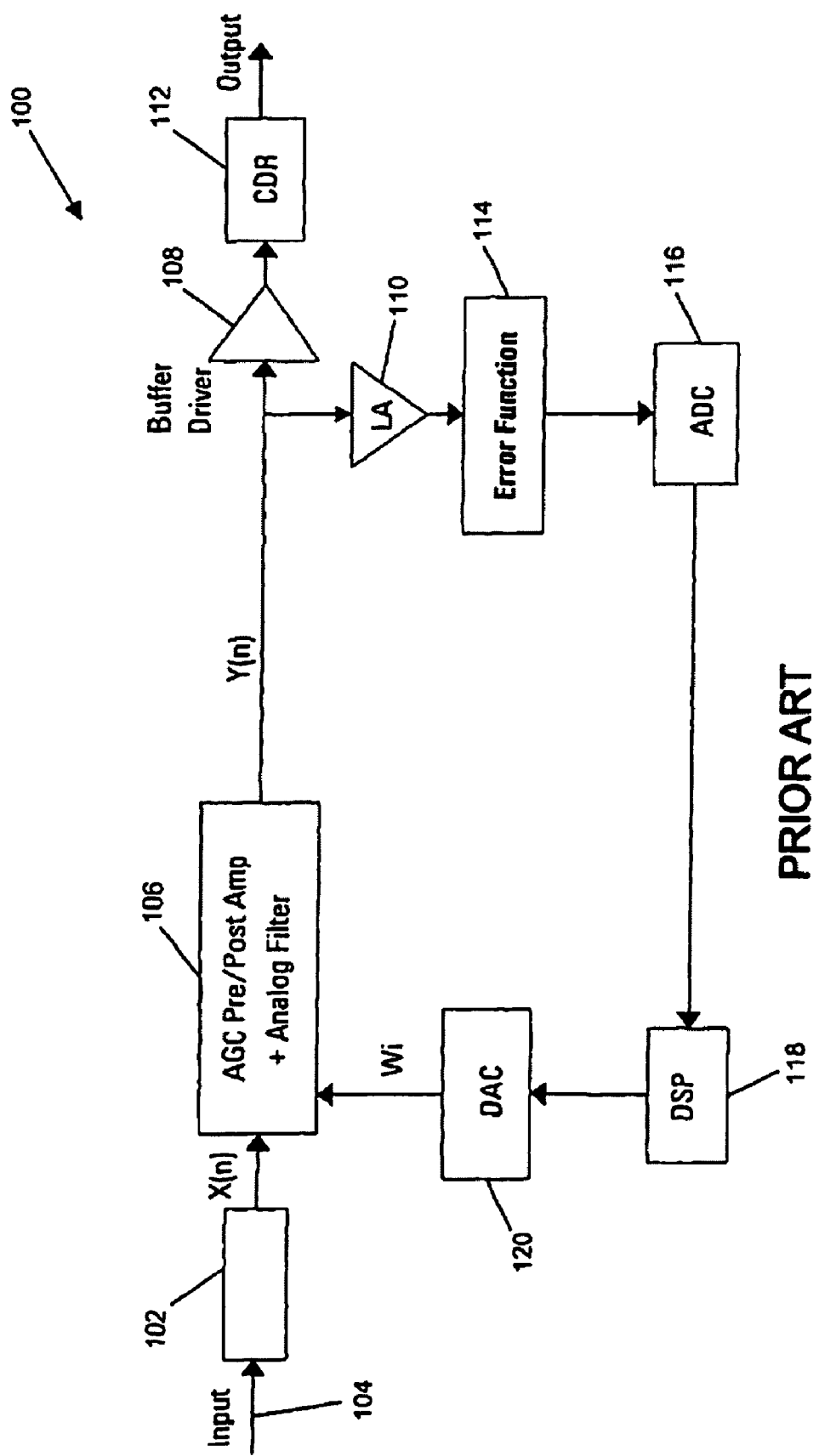
FIG. 1 is a schematic diagram of a channel equalization loop.

Referring to FIG. 1, a channel equalization loop 100 comprises a loop input interface 102 coupled to an optical fibre 104 supporting a fibre-optic channel, for example a multi-mode fibre-optic channel. As is typical, the loop input interface 102 comprises an optoelectronic device, for example a photodetector, and is coupled to Automatic Gain Control (AGC) pre- and post-amplifiers and an analogue filter represented by the filter unit 106. The filter unit 106 is coupled to a buffer driver 108 and a linear amplifier 110. The buffer driver 108 is coupled to a Clock Data Recovery (CDR) circuit 112, whilst the linear amplifier 110 is coupled to an error calculation unit 114.

The error calculation unit 114 is coupled to an Analogue to Digital Converter (ADC) circuit 116, the ADC circuit 116 being coupled to a Digital Signal Processor (DSP) 118. The DSP 118 executes a suitable algorithm necessary to set tap coefficients of the analogue filter of the filter unit 106 in response to (a digitised representation of) an averaged error signal from the error calculation unit 114 via the ADC circuit 116. The DSP 118 is coupled to a Digital to Analogue Converter (DAC) circuit 120 for translating a digital output signal generated by the DSP 118 into the analogue domain and hence applying analogue filter tap weights (Wi) to the filter unit 106 in order to set the tap coefficient of the analogue filter as mentioned above.

Since the above structure is known in relation to channel equalization, the operation of the channel equalization loop 100 will not, for the sake of clarity and conciseness of description, be described further herein with the exception of pointing out that the error calculation unit 114 receives an input sequence of symbols received from the filter unit 106 via the linear amplifier 110.

Figure 2:
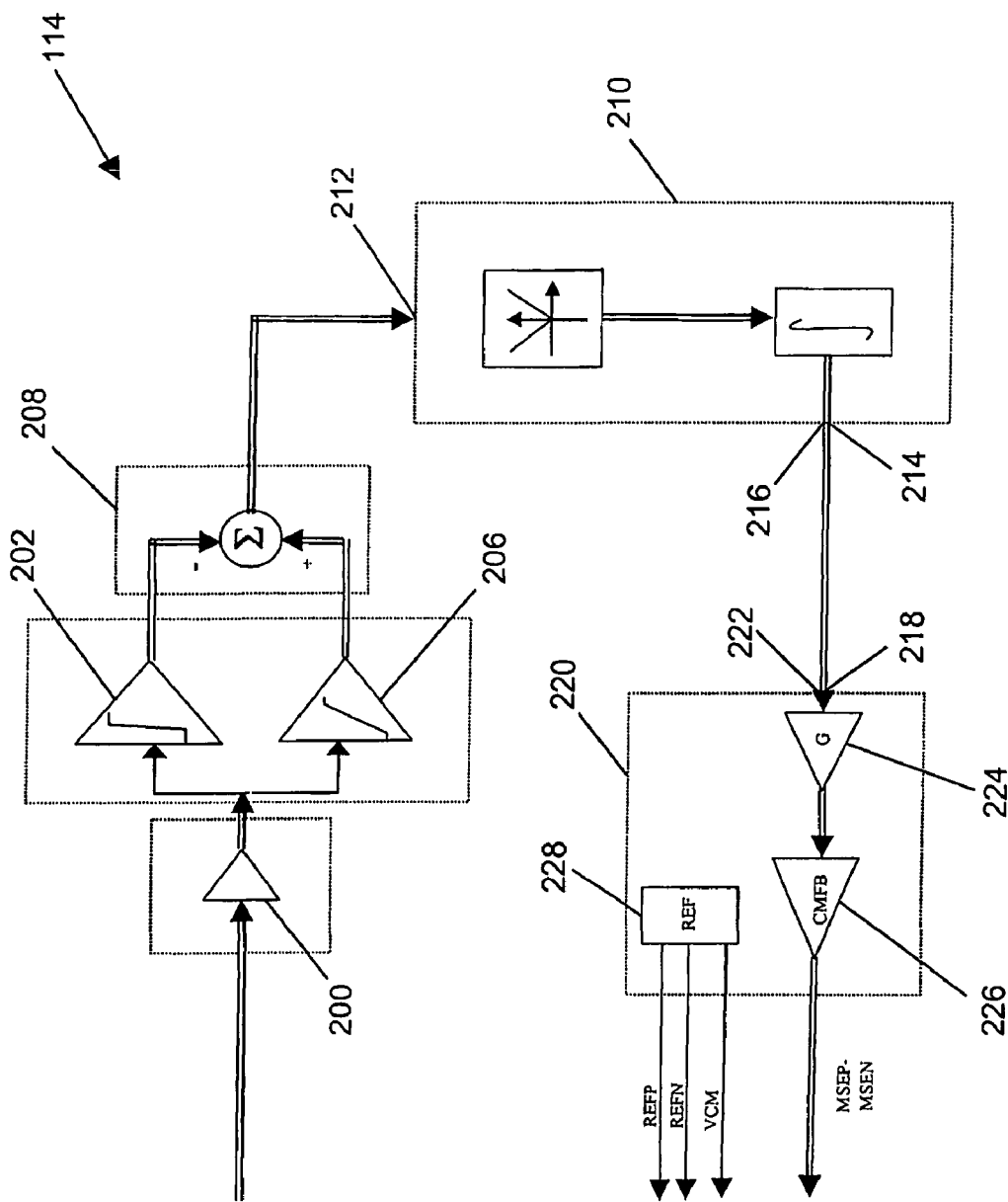
FIG. 2 is a schematic diagram of an error calculation unit of FIG. 1 and constituting an embodiment of the invention.

Turning to FIG. 2, the error calculation unit 114 comprises a variable gain preamplifier 200 coupled to a decision, or slicer, circuit 202 (sometimes known as an "quantizer" circuit). Decision circuits are known in the art and so the skilled person will appreciate that any suitable decision circuit can be employed, for example a limiting amplifier circuit. In this example, the variable gain preamplifier 200 is also coupled to a linear buffer 206, the limiting amplifier 202 and the linear buffer 206 sharing an output of the variable gain preamplifier 200. Outputs of the limiting amplifier 202 and the linear buffer 206 are respectively coupled to an error generator 208. The error generator 208 is, in this example, a summation unit arranged to subtract an output of the limiting amplifier 202 from an output of the linear buffer 206.

In operation, the variable gain preamplifier 200 receives an input sequence of symbols suffering from intersymbol interference and conditions the input sequence of symbols. Both the limiting amplifier 202 and the linear buffer 206 then process the amplified input sequence of symbols. The limiting amplifier 202 processes the amplified input sequence of symbols so as to recover an approximation of a plurality of symbols from the amplified input sequence of symbols. The linear buffer 206 serves to delay the amplified input sequence of symbols so as to maintain the amplified input sequence of symbols in synchronism with the recovered approximation of the plurality of symbols.

At the error generator 208, the recovered approximation of the plurality of symbols is subtracted from the amplified input sequence of symbols to yield an error signal of a type known in the art. In this example, the error signal is a differential error signal. Further, since the data rate of the channel is 10 Gbps, the error signal also possesses the same data rate.

The error generator 208 is coupled to an averaging circuit 210 via a differential error input 212 for processing of the differential error signal. The averaging circuit 210 also comprises an averaged output terminal 214 and a reference output terminal 216 that are both respectively coupled to a first input terminal 218 of a signal conditioning unit 220 and a second input terminal 222 of the signal conditioning unit 220.

For completeness, the signal conditioning unit 220 serves as an interface between the error calculation unit 210 and the ADC circuit 116. The signal conditioning unit 220 comprises a conditioning pre-amplifier 224 having inputs coupled to the first and second input terminals 218, 222 of the signal conditioning unit 220 and a differential output coupled to a differential input of a common mode feedback amplifier 226, the common mode feedback amplifier 226 being coupled to the ADC circuit 116 so as to provide a conditioned differential output signal to the ADC circuit 116. The common mode feedback amplifier 226 is used, in this example, to generate a differential signal with a maximum amplitude of +/−1V and to ensure that a common mode of the differential output signal is about 1 V. The signal conditioning unit 220 also comprises a reference generator unit 228 that generates three Direct Current (DC) reference signals for use by the ADC circuit 116.

Figure 3:
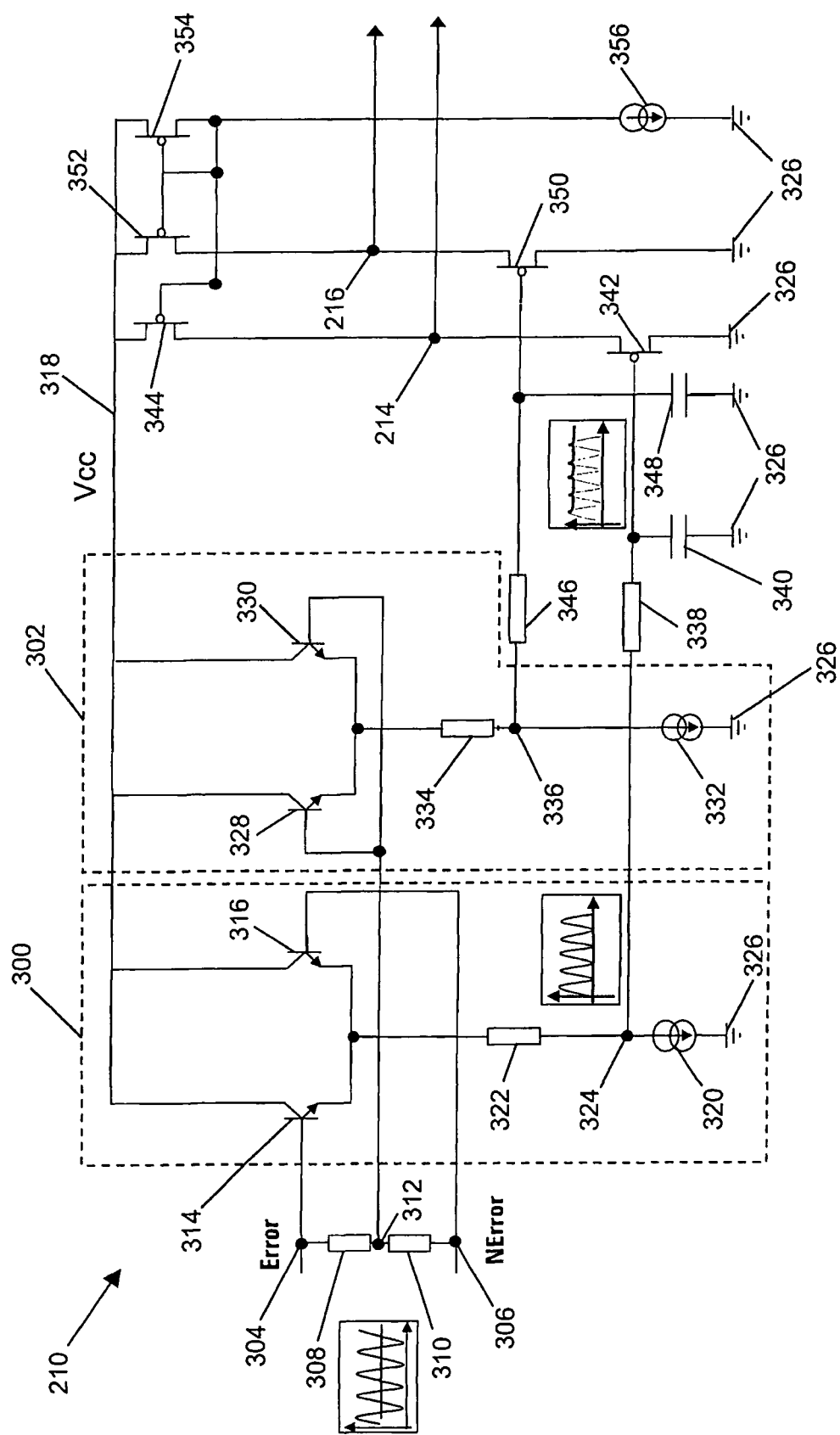
FIG. 3 is a schematic diagram of an integrated circuit constituting an averaging circuit of FIG. 2.

Turning to FIG. 3, the averaging circuit 210 comprises a first differential pair circuit unit 300 and a second differential pair circuit unit 302. A first differential input terminal 304 of the averaging circuit 210 is coupled to a second differential input terminal 306 of the averaging circuit 210 via a voltage divider circuit arrangement comprising a first resistor 308 coupled to the first differential input terminal 304 and a second resistor 310, the second resistor 310 also being coupled to the second differential input terminal 306 and a junction between the first and second resistors 308, 310 constituting a first, common-mode, node 312. The first and second resistors 308, 310 have a same resistance value.

The first differential input terminal 304 is also coupled to a base terminal of a first npn bipolar transistor 314 of the first differential pair circuit 300. Likewise, the second differential input terminal 306 is coupled to a base terminal of a second npn bipolar transistor 316 of the first differential pair circuit 300. The first differential pair circuit 300 is thus arranged to operate in a difference mode. Collector terminals of the first and second bipolar transistors 314, 316 are coupled to a positive supply rail 318 maintained at a potential of Vcc volts, for example 2.5V. Emitter terminals of the first and second bipolar transistors 314, 316 are coupled together, the coupled emitter terminals of the first and second bipolar transistors 314, 316 being coupled to a first current source 320 via a first tail resistor 322 for providing voltage offset correction. The first trail resistor 322 being coupled to the first current source 320 via a second node 324, the first current source 320 being coupled to an earth rail 326 maintained at ground potential.

The first node 312 is coupled to base terminals of a third npn bipolar transistor 328 of the second differential pair circuit 302 and a fourth npn bipolar transistor 330 of the second differential pair circuit 302, respectively, the base terminals of the third and fourth bipolar transistors 328, 330 hence being coupled together. Collector terminals of the third and fourth bipolar transistors 328, 330 are coupled to the positive supply rail 318. Emitter terminals of the third and fourth bipolar transistors 328, 330 are coupled together, the coupled emitter terminals of the third and fourth bipolar transistors 328, 330 being coupled to a second current source 332 via a second tail resistor 334 for providing voltage offset correction. The second trail resistor 334 is coupled to the second current source 332 via a third node 336, the second current source 332 being coupled to the earth rail 326.

The second node 324 is coupled to a first terminal of a fifth resistor 338, a second terminal of the fifth resistor 338 being coupled to a first terminal of a first capacitor 340 and a gate terminal of a first P-channel Metal Oxide Semiconductor (PMOS) transistor 342. A second terminal of the first capacitor 340 is coupled to the earth rail 326. A drain terminal of the first PMOS transistor 342 is coupled to a source terminal of a second PMOS transistor 344 via the averaged output terminal 214, a drain terminal of the second PMOS transistor 344 being coupled to the positive supply rail 318; the second PMOS transistor 344 constitutes a third current source. A source terminal of the first PMOS transistor 342 is coupled to the earth rail 326.

The third node 336 is coupled to a first terminal of a sixth resistor 346, a second terminal of the sixth resistor 346 being coupled to a first terminal of a second capacitor 348 and a gate terminal of a third PMOS transistor 350. A second terminal of the second capacitor 348 is coupled to the earth rail 326. A drain terminal of the third PMOS transistor 350 is coupled to a source terminal of a fourth PMOS transistor 352 via the reference output terminal 216, a drain terminal of the fourth PMOS transistor 352 being coupled to the positive supply rail 318; the fourth PMOS transistor 352 constitutes a fourth current source. A source terminal of the third PMOS transistor 350 is coupled to the earth rail 326.

A drain terminal of a fifth PMOS transistor 354 is also coupled to the positive supply rail 318 and a source terminal of the fifth PMOS transistor 354 is coupled to a first terminal of a fifth current source 356. A second terminal of the fifth current source 356 is coupled to the earth rail 326, a gate terminal of the fifth PMOS transistor 356 being coupled to gate terminals of the second and fourth PMOS transistors 344, 352 and the source terminal of the fifth PMOS transistor 354. In this example, the second, fourth and fifth PMOS transistors 344, 352, 354 constitute a current mirror.

In operation, the first and second differential input terminals 304, 306 receive a peak-to-peak differential input signal in the form of the differential error signal. The differential error signal is half-wave rectified by the first differential pair circuit 300, resulting in a rectified output signal constituting a rectified version of the differential error signal being provided at the second node 324. The differential error signal is also divided by the voltage divider arrangement comprising the first and second resistors 308, 310 and applied via the first node 312 to the tied base terminals of the third and fourth bipolar transistors 328, 330 of the second differential pair circuit 302. Since the base terminals of the third and fourth bipolar transistors 328, 330 are tied together, the second differential pair circuit 302 operates in a common mode, the divided differential error signal constituting a common mode input signal. In response to the divided differential error signal, the second differential pair circuit 302 generates a reference output voltage signal of the averaging circuit 210 at the third node 336.

The rectified output signal is then filtered by the fifth resistor 338 and the first capacitor 340, thereby effectively integrating the rectified output signal, i.e. the rectified version of the error signal. The integrated rectified error signal constitutes a Root Mean Square (RMS) error signal that is then level shifted by the first PMOS transistor 342 and the third current source 344 so as to shift a bias level of the RMS error signal, and provided at the averaging output terminal 214 of the error calculation unit 210. Likewise, the reference output voltage signal at the third node 336 is filtered by the sixth resistor 346 and the second capacitor 348 to remove any noise that may be present, thereby effectively integrating the reference output voltage signal. The integrated reference output voltage signal is then level shifted by the third PMOS transistor 350 and the fourth current source 352 so as to shift a bias level of the integrated reference output voltage signal, and provided at the reference output terminal 216 of the error calculation unit 210.

Consequently, the RMS error signal, an averaged representation of the error signal, is provided at the averaged output terminal 214 along with a reference signal at the reference output terminal 216. In this example, the reference signal is provided instead of referencing the RMS error signal to the ground rail 326, since the ground rail 325 is subject to noise.

Hence, it can be seen that by integrating a rectified version of the error signal, an averaged representation of the error signal can be generated without the need of a linear multiplier circuit used by an MSE circuit. In this respect, it should be understood that the RMS error signal is a good approximation of an MSE error signal due to the non-linearity of the first differential pair circuit arrangement 300, i.e. the rectifier.

Whilst in the above example, the values of the fifth and sixth resistors 338, 346 and the first and second capacitors 340, 348 are fixed, it should be appreciated that a period of time over which the rectified version of the error signal is integrated (and hence averaged) can be varied/selected by, for example, employing switched resistor and/or capacitor networks in the above-described circuit of FIG. 3.

Although the above example has been described in the context of an error signal corresponding to a channel supporting a data rate of about 10 Gbps, the skilled person will appreciate that the above example is compatible with data rates having a same order of magnitude as a transition frequency of one or more switching devices, for example transistors, of the rectifier. Indeed, the data rate can be more than about 1 Gbps, for example more than 5 Gbps.

The invention claimed is:
1. A fiber optic channel equalization loop circuit, comprising:
   a loop input interface;
   a filter circuit operably connected to the loop input interface;
   a feedback loop operably connected to the filter circuit, the feedback loop comprising an error calculation circuit comprising an averaging circuit, the averaging circuit comprising:
      a rectifier having an input for receiving an error signal associated with a fiber optic channel operably connected to the loop input interface; and an integrator coupled to the rectifier, the integrator being configured to provide an error output signal that is an averaged representation of the error signal;

wherein the error calculation circuit, the rectifier and the integrator are configured to provide the error output signal to additional circuitry in the feedback loop, the additional circuitry being operably connected to the filter circuit and configured to adjust settings in the filter circuit on the basis of the error output signal.

2. The circuit of claim 1, wherein the input is a differential input configured to receive a differential error signal.

3. The circuit of claim 1, further comprising a reference output configured to provide a reference signal derived from the error signal.

4. The circuit of claim 1, wherein the rectifier is a half-wave rectifier.

5. The circuit of claim 1, wherein the rectifier is a first differential pair circuit arrangement.

6. The circuit of claim 1, wherein the integrator is a filter.

7. The circuit of claim 3, further comprising a reference circuit arrangement coupled to the reference output.

8. The circuit of claim 1, wherein the rectifier and the integrator are configured, when in use, to provide the error output signal as an approximation of a mean square error signal.

9. The circuit of claim 1, further being characterized in having an input data rate associated therewith, when in use, that is greater than about 1 Gbps.

10. The circuit of claim 1, further being characterized in having an input data rate, when in use, of a same order of magnitude as a transition frequency of a switching device of the rectifier.

11. The circuit of claim 1, wherein the error calculation circuit is a root mean square error circuit.

12. The circuit of claim 1, further comprising
a decision unit configured to recover an approximation of a plurality of symbols from the error signal, the decision unit being coupled to the error calculation circuit.

* * * * *